US011615460B1

(12) United States Patent
McNamara et al.

(10) Patent No.: US 11,615,460 B1
(45) Date of Patent: Mar. 28, 2023

(54) USER PATH DEVELOPMENT

(71) Applicant: Amazon Technologies, Inc., Reno, NV (US)

(72) Inventors: Alexander Michael McNamara, Seattle, WA (US); Kirk Arlo Petersen, Seattle, WA (US); Nathan Lee Wesling, Seattle, WA (US); Jack Bradley Jones, Seattle, WA (US); Sridhar Boyapati, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 769 days.

(21) Appl. No.: 14/090,662

(22) Filed: Nov. 26, 2013

(51) Int. Cl.
*G06Q 10/06* (2012.01)
*G06Q 10/08* (2012.01)
*G06Q 30/06* (2012.01)
*G06Q 30/0601* (2023.01)
*G06Q 10/0631* (2023.01)
*G06Q 10/087* (2023.01)
*G06Q 10/0835* (2023.01)

(52) U.S. Cl.
CPC ... *G06Q 30/0639* (2013.01); *G06Q 10/06312* (2013.01); *G06Q 10/087* (2013.01); *G06Q 10/08355* (2013.01)

(58) Field of Classification Search
CPC ............ G06Q 30/0639; G06Q 10/06312
See application file for complete search history.

(56) References Cited

U.S. PATENT DOCUMENTS

| | | | |
|---|---|---|---|
| 6,185,314 B1 | 2/2001 | Crabtree et al. | |
| 6,263,088 B1 | 7/2001 | Crabtree et al. | |
| 6,381,583 B1 * | 4/2002 | Kenney .................. | G06Q 20/02 705/26.41 |
| 6,386,450 B1 * | 5/2002 | Ogasawara ............. | G07F 11/54 235/375 |
| 6,434,530 B1 * | 8/2002 | Sloane ................... | G06Q 20/20 235/383 |
| 6,595,417 B2 * | 7/2003 | O'Hagan et al. .... | G06K 7/0004 235/375 |
| 6,954,735 B1 * | 10/2005 | Djupsjobacka ........ | G06Q 30/06 701/533 |
| 7,225,980 B2 | 6/2007 | Ku et al. | |
| 7,734,507 B2 | 6/2010 | Ritter | |
| 7,949,568 B2 | 5/2011 | Fano et al. | |

(Continued)

OTHER PUBLICATIONS

Abhaya Asthana et al., "An Indoor Wireless System for Personalized Shopping Assistance", Proceedings of IEEE Norkshop on Mobile Computing Systems and Applications, 1994, pp. 69-74, Publisher: IEEE Computer Society Press.

(Continued)

*Primary Examiner* — Peter Ludwig
(74) *Attorney, Agent, or Firm* — Athorus, PLLC

(57) ABSTRACT

Described is a system and method for developing and dynamically updating user paths through a materials handling facility. A user path through a materials handling facility may be developed that will route a user past one or more items (e.g., pick list items, recommended items, wish list items, promotional items) planned for the user. If the user does not follow the user path, the user path may be dynamically updated to account for the current location of the user and/or to consider other actions performed by the user.

18 Claims, 7 Drawing Sheets

(56) References Cited

U.S. PATENT DOCUMENTS

| | | | |
|---|---|---|---|
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,467,961 B2 | 6/2013 | Obradovich et al. | |
| 8,630,924 B2 | 1/2014 | Groenevelt et al. | |
| 8,688,598 B1 | 4/2014 | Shakes et al. | |
| 8,930,134 B2 | 1/2015 | Gu et al. | |
| 9,473,747 B2 | 10/2016 | Kobres et al. | |
| 2002/0065680 A1* | 5/2002 | Kojima | G06Q 20/20 705/21 |
| 2002/0065714 A1* | 5/2002 | Goodwin, III | G06Q 30/02 705/14.25 |
| 2002/0069131 A1* | 6/2002 | Miyata | G06Q 10/06 705/26.9 |
| 2002/0167408 A1* | 11/2002 | Trajkovic | G06Q 30/06 340/573.1 |
| 2002/0174021 A1* | 11/2002 | Chu | G06Q 10/063 705/7.11 |
| 2003/0002712 A1 | 1/2003 | Steenburgh et al. | |
| 2003/0055707 A1* | 3/2003 | Busche | G06Q 30/02 705/14.65 |
| 2004/0181467 A1 | 9/2004 | Raiyani et al. | |
| 2004/0228503 A1 | 11/2004 | Cutler | |
| 2006/0047577 A1* | 3/2006 | Dietz | G06Q 30/0601 705/26.1 |
| 2006/0059049 A1* | 3/2006 | Morris | G06Q 30/0601 705/26.1 |
| 2007/0191026 A1* | 8/2007 | Teplitsky | G01C 21/20 455/456.3 |
| 2007/0211938 A1 | 9/2007 | Tu et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0174485 A1 | 7/2008 | Carani et al. | |
| 2009/0010490 A1 | 1/2009 | Wang et al. | |
| 2009/0052739 A1 | 2/2009 | Takahashi et al. | |
| 2009/0121017 A1 | 5/2009 | Cato et al. | |
| 2009/0129631 A1 | 5/2009 | Faure et al. | |
| 2009/0245573 A1 | 10/2009 | Saptharishi et al. | |
| 2009/0304229 A1 | 12/2009 | Hampapur et al. | |
| 2009/0324020 A1 | 12/2009 | Hasebe et al. | |
| 2010/0262554 A1* | 10/2010 | Elliott | G01C 21/20 705/323 |
| 2010/0266159 A1 | 10/2010 | Ueki et al. | |
| 2011/0011936 A1 | 1/2011 | Morandi et al. | |
| 2011/0080336 A1 | 4/2011 | Leyvand et al. | |
| 2011/0184945 A1* | 7/2011 | Das | G01C 21/206 707/724 |
| 2012/0020518 A1 | 1/2012 | Taguchi | |
| 2012/0026335 A1 | 2/2012 | Brown et al. | |
| 2012/0066035 A1* | 3/2012 | Stanger | G06Q 30/0207 705/14.1 |
| 2012/0093364 A1 | 4/2012 | Sato | |
| 2012/0170804 A1 | 7/2012 | Lin et al. | |
| 2012/0281878 A1 | 11/2012 | Matsuda et al. | |
| 2012/0284132 A1 | 11/2012 | Kim et al. | |
| 2013/0076898 A1 | 3/2013 | Philippe et al. | |
| 2013/0182114 A1 | 7/2013 | Zhang et al. | |
| 2013/0182905 A1 | 7/2013 | Myers et al. | |
| 2013/0184887 A1 | 7/2013 | Ainsley et al. | |
| 2013/0253700 A1 | 9/2013 | Carson et al. | |
| 2013/0346204 A1* | 12/2013 | Wissner-Gross | G06Q 30/0281 705/14.58 |
| 2014/0050352 A1 | 2/2014 | Buehler et al. | |
| 2014/0072170 A1 | 3/2014 | Zhang et al. | |
| 2014/0072174 A1 | 3/2014 | Wedge | |
| 2014/0093274 A1* | 4/2014 | Kitamura | G03G 15/0136 399/111 |
| 2014/0107842 A1 | 4/2014 | Yoon et al. | |
| 2014/0279294 A1 | 9/2014 | Field-Darragh et al. | |
| 2014/0289072 A1 | 9/2014 | Pradhan et al. | |
| 2014/0328512 A1 | 11/2014 | Gurwicz et al. | |
| 2014/0355825 A1 | 12/2014 | Kim et al. | |
| 2014/0362223 A1 | 12/2014 | LaCroix et al. | |
| 2014/0363059 A1* | 12/2014 | Hurewitz | G06Q 30/0201 382/118 |
| 2015/0019391 A1 | 1/2015 | Kumar et al. | |
| 2015/0073907 A1 | 3/2015 | Purves et al. | |
| 2015/0146921 A1 | 5/2015 | Ono et al. | |
| 2015/0213328 A1 | 7/2015 | Mase | |
| 2015/0262365 A1 | 9/2015 | Shimizu | |
| 2015/0294396 A1* | 10/2015 | Goodwin | G06Q 30/0639 705/26.9 |
| 2016/0110613 A1 | 4/2016 | Ghanem et al. | |
| 2016/0217326 A1 | 7/2016 | Hosoi | |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

* cited by examiner

US 11,615,460 B1

USER PATH DEVELOPMENT

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers, that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference number in different figures indicates similar or identical items or features.

Figure 1:
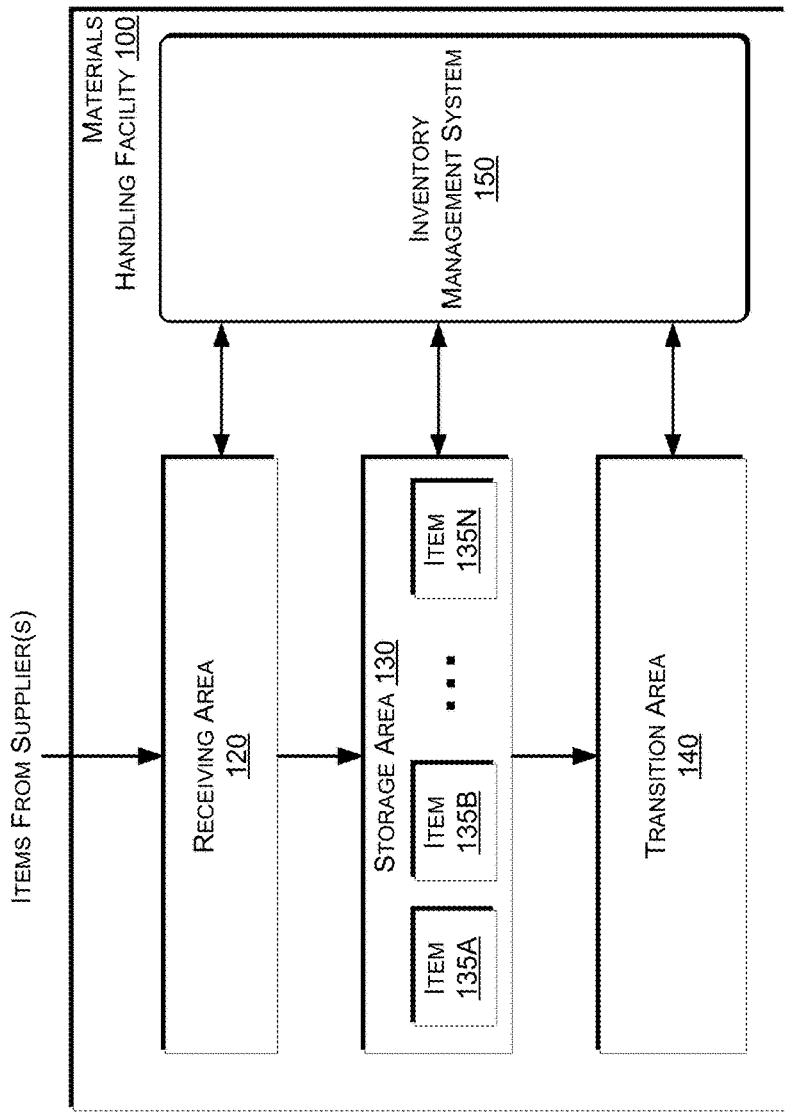
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed descriptions thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system for developing and dynamically updating user paths through a materials handling facility. The system may develop a user path that will navigate the user past one or more items (e.g., pick list items, recommended items, wish list items, promotional items) planned for the user. The path may be developed based on the location of the items and/or based on user routing preferences. As the user navigates through the materials handling facility, the user path is presented to the user. For example, the user path may be projected or otherwise presented on the floor of the materials handling facility, presented on displays located in the materials handling facility, presented on a portable device in the possession of the user, etc.

The system may also monitor the user's movement and activities in the materials handling facility and dynamically update the user path based on those movements and/or activities. For example, if the user navigates away from the developed user path, the system will update the user path to include the new direction of the user.

In some implementations, the actions (e.g., behavior, gestures) of the user may be monitored and used to develop and/or update the user path for the user. Users often present different gestures that can be visually identified. For example, a user may smile, frown, squint, shake their head, tilt their head to the side, etc. (each a gesture) to express happiness, sadness, confusion, etc. These types of gestures may be used to identify items, areas and/or other individuals within the materials handling facility that are preferred and/or not preferred by the user.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within the materials handling facility 100 is depicted functionally rather than schematically. For example, in some implementations, multiple different receiving areas 120, storage areas 130, and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, or as a user progresses through the materials handling facility 100, the corresponding items 135 may be selected or "picked" from storage area 130. For example, in one implementation, a user may have a list of items to pick and may progress through the materials handling facility picking items 135 from the storage area 130. In other implementations, materials handling facility employees may pick items 135 using written or electronic pick lists derived from customer orders.

Figure 2:
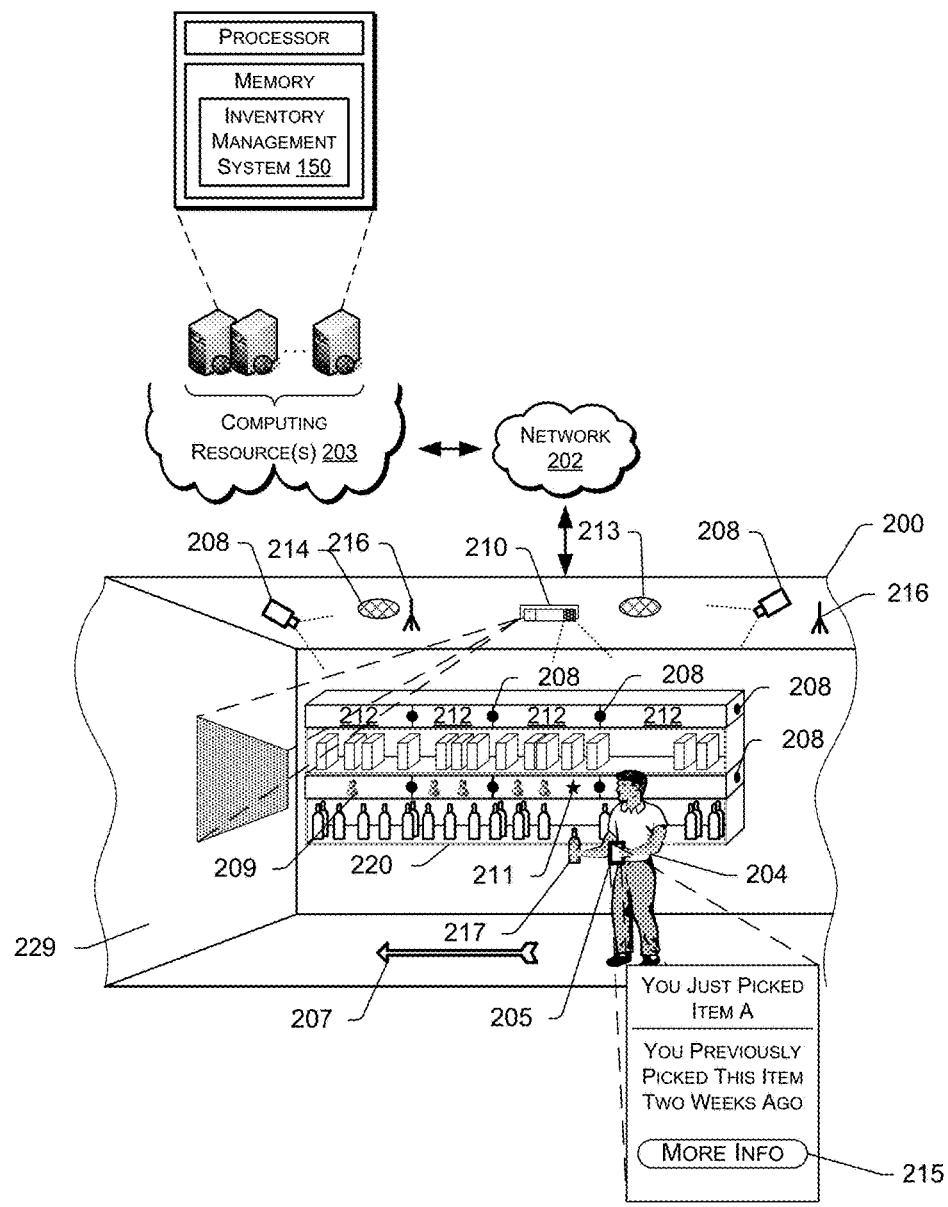
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations and/or users within the materials handling facility can be captured. In some implementations, the image capture devices 208 may be positioned overhead, such as on the ceiling to capture images of users and/or locations within the materials handling facility. In addition, in some implementations, one or more cameras 208 may be positioned on or inside of inventory locations. For example, a series of cameras 208 may be positioned on external portions of the inventory locations and positioned to capture images of users and/or the location surrounding the inventory location. Likewise, one or more cameras 208 may be positioned within the inventory locations to capture images of items stored in the inventory locations.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, a scale, a light curtain, etc. may be utilized with the implementations described herein. For example, a pressure sensor and/or a scale may be used to detect when an item is added and/or removed from inventory locations.

When the user 204 arrives at the materials handling facility 200, one or more images of the user 204 may be captured and processed. For example, the images of the user 204 may be processed to identify the user 204. This may be done using a variety of techniques such as facial recognition, pattern matching, etc. In some implementations, rather than, or in addition to, processing images to identify the user, other techniques may be utilized to identify the user. For example, the user may provide an identification (e.g., user name, password), the user may present an identifier (e.g., identification badge, card), an active tag (e.g., RFID tag) in the possession of the user may be detected, a visual tag in the possession of the user may be detected, biometrics may be utilized to identify the user, etc.

The captured images and/or other inputs may also be used to establish a user pattern for the user 204 while located in the materials handling facility 200. The user pattern may identify an overall shape of the user 204, any distinguishing features of the user 204 (e.g., color of shirt, height) that may be used to assist in the identification and/or tracking of the user 204 as the user progresses through the materials handling facility 200.

In some implementations, a user 204 located in the materials handling facility 200 may possess a portable device 205 and obtain information about items located within the materials handling facility 200. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

Generally, the inventory management system 150 may include one or more input/output devices, such as imaging devices (e.g., cameras) 208, projectors 210, displays 212, speakers 213, microphones 214, etc. to facilitate communication between the inventory management system 150 and/or the user 204. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s), such as server system 203 that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202.

The following is an example use case for developing and providing a user path for the user 204 through the materials handling facility 200 based on planned items for the user and preferences of the user 204. As used herein, a planned item may include focal items and/or non-focal items. A focal item is any item that is planned to be picked by the user. For example, a focal item may be an item included on a user's pick list—a list of items that are to be picked by the user, items identified by the user that they are going to pick (e.g., shopping list), and the like. Non-focal items include any other items identified as of potential interest to the user and included in the planning of the user path through the materials handling facility. Unplanned items are any items picked by the user that are not planned items.

When a user enters the materials handling facility, the inventory management system 150 may identify the user 204 (e.g., facial recognition, user ID card, user provided information, biometrics). Upon identifying the user 204, a user profile may be retrieved from a user data store. The user profile may include, among other information, item pick history, item view history, purchase history, routing preferences, associations with other users, etc.

Focal items may also be identified for the user. For example, the user may provide a pick list to the inventory management system 150 and/or have an associated pick list identifying items to be picked from the materials handling facility retrieved from a data store. In other implementations, the inventory management system 150 may utilize information about the user to identify the items the user will likely pick (focal items). For example, if the user historically picks the same four items each time they are in the materials handling facility, it may be determined that the user will again pick the same four items.

In addition, based on the user profile and/or focal items, one or more non-focal items may be identified. For example, recommended items (non-focal items) may be identified based on past user picks, based on picks made by other users, etc. Likewise, non-focal items may include items on a user's wish list, items that are often picked along with the identified focal items, promotional items, sale items, items related to one or more of the focal items, items previously picked by the user, created items paired with a focal item, a new release item, a best seller item, etc.

Utilizing the user profile, the current location of the user, focal items and non-focal items, a user path may be created and provided to the user. The user path provides a recommended path for the user to follow as they progress through the materials handling facility that passes by each of the focal items and non-focal items. The user path may be the shortest path needed through the materials handling facility to pick the identified items, the least congested path through the materials handling facility to pick the items, a path that includes one or more areas within the materials handling facility preferred by the user, a path that intersects with another user that is preferred by the user, a path that avoids another user, etc. The user path may be provided to the user via the portable device 205, projected using one or more of the output devices, audibly output to the user, etc. For example, an arrow 207 or other visual identifier may be projected onto the floor of the materials handling facility by one or more of the projectors 210 to provide guidance to the user. In other implementations, the floor may have included display panels or lights that can be used to present the user path to the user. In still other implementations, the visual identifier may be presented on one or more of the displays 212. In some implementations, multiple visual identifiers may be presented to the user to identify the user path.

The visual identifiers may be unique to the user to assist the user in identifying the user path associated with the user. For example, the visual identifier 209 may be unique to the user. The visual identifier may be selected and/or provided by the user, or assigned to the user by the inventory management system 150. If there are multiple users in the same area of the materials handling facility, the appropriate user identifier may be detected by each user so that the user can identify appropriate user path.

As discussed further below, the user path may be dynamically updated as the user navigates through the materials handling facility. For example, if the user does not follow the provided path, the user path may be updated and a new user path provided to the user based on the user's current location and the planned items that have not been picked. Likewise, if the user path was developed to intersect with and/or avoid another user, if that other user does not progress through the materials handling facility as anticipated, the user's user path may be updated accordingly. As still another example, if the user picks an unplanned item, information about that item may be used to identify other items of potential interest to the user. The user path may then be updated to route the user past those newly identified items.

In some implementations, as the user progresses through the materials handling facility 200, an imaging device 208 may obtain/capture one or more images of the user 204 and provide the image(s) to the computing resource(s) 203 for processing. The computing resource(s) 203 may process the image(s) to identify any gestures presented by the user (e.g., smile, frown, squint, shake head, tilt head). For example, the images may be processed to detect changes in facial or head expressions of the user. Those changes may be analyzed to detect gestures presented by the user and the detected gesture associated with the user's location in the materials handling facility and/or the item being viewed by the user.

As the user moves around the materials handling facility, the inventory management system 150 may assist the user in identifying planned items and/or discovering information about items by processing images collected by input/output components 208-216 positioned around the materials handling facility. For example, when the user reaches a location in the materials handling facility 200 that includes a planned item, a visual identifier may be presented at, on or near the planned item. For example, the visual identifier 211 is presented over the location of the planned item 217 that was picked by the user 204.

In addition to, or as an alternative to visual and/or audio location determination and tracking of the user, the inventory management system 150 may also utilize other techniques, such as triangulation between antennas 216, to determine the location of the user 204 as the user moves through the materials handling facility 200. In other examples, the portable device 205 may include a global positioning system (GPS) receiver that obtains GPS information as to the location of the portable device 205. In other implementations, the portable device 205 may be detectable and/or communicate with an indoor positioning system. In such an implementation, the portable device 205 may provide the received GPS information to the inventory management system 150. In other implementations, the portable device 205 may be detectable and/or communicate with an indoor positioning system.

If information is presented to the user from the inventory management system 150 via the portable device 205, the user 204 may interact with the inventory management system 150 via the portable device 205. For example, the user 204 may interact with the portable device 205 by selecting (e.g., via a touch screen) a display control, such as the "More Info" control 215. If the user selects the "Item Info" control 215, the portable device 205 may submit a request to the inventory management system 150 for additional item information. The inventory management system 150, upon receiving an additional item information request from the portable device 205, may retrieve additional item information and provide it back to the user via the portable device 205, present it on one of the displays 212, or project it from the projector 210 onto a surface, such as the surface 229. For example, the inventory management system 150 may identify a display location near the user for presenting the information. If the user is in a location where there are displays, such as displays 212 that are available for use, the display 212 closest to the user 204 may be selected for presenting the additional item information to the user. Alternatively, a projector 210 may be used to project additional item information onto a surface area 229 near the user 204.

Figure 3:
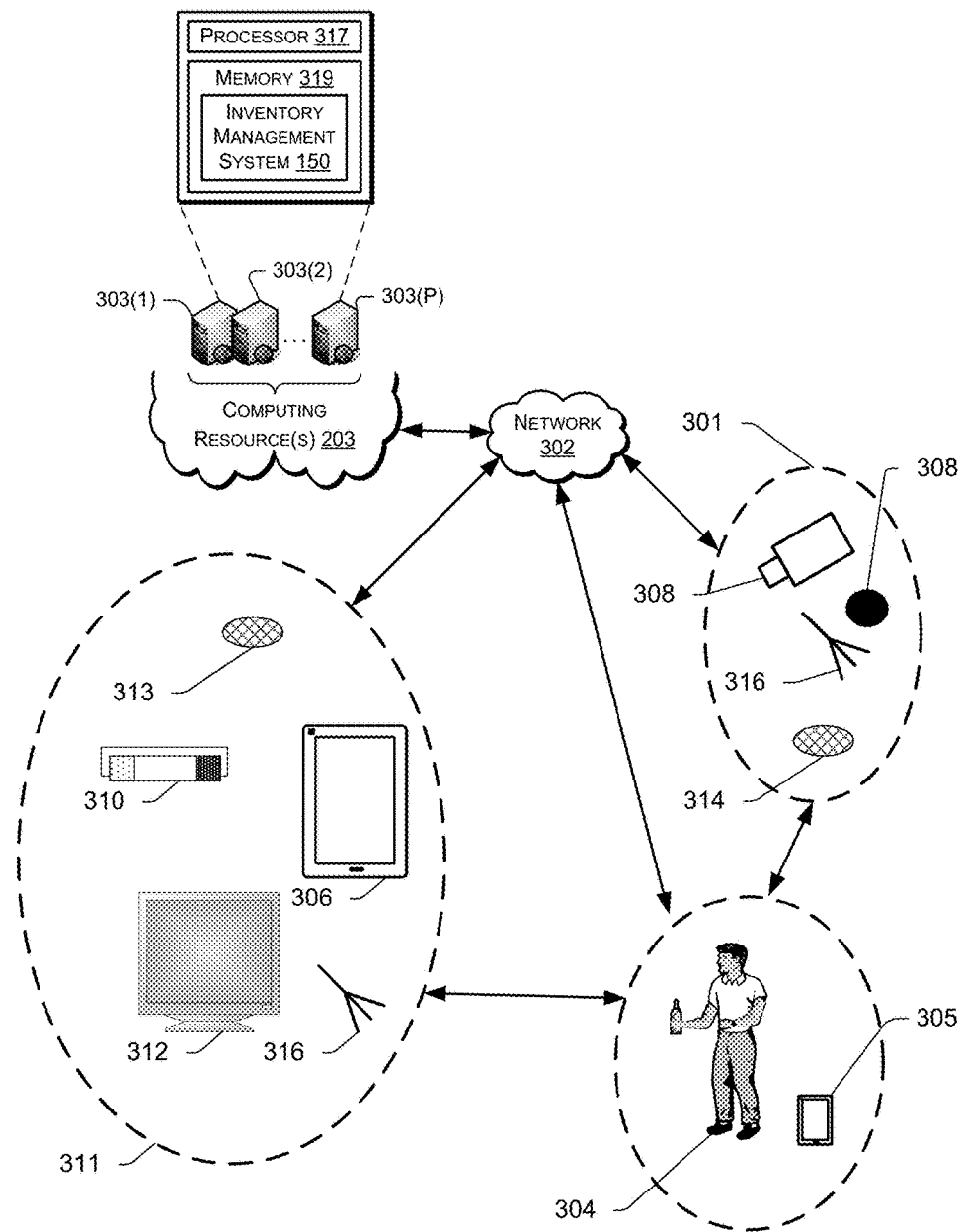
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components of an inventory management system 150 over a variety of communication paths. Generally, the inventory management system 150 may include input components 301, output components 311, and computing resource(s) 203. The input components 301 may include an imaging device 308, microphone 314, antenna 316, or any other component that is capable of receiving input about the surrounding environment from the user of the portable device and/or from the portable device. The output components 311 may include a projector 310, a portable device 306, a display 312, an antenna 316, a radio (not shown), speakers 313 and/or any other component that is capable of providing output to the surrounding environment, the user and/or the portable device.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 301, output components 311, and/or directly with the portable device 305 and/or the user 304.

As illustrated, the computing resource(s) 203 may be remote from the environment and implemented as one or more servers 303(1), 303(2), . . . , 303(P) and may, in some instances form a portion of a network-accessible computing platform implemented as a computing infrastructure of processors, storage, software, data access, and so forth that is maintained and accessible by components/devices of the inventory management system 150 and/or the portable device 305 via a network 302 such as the Internet. For example, the computing resources 203 may process images of users 304 to identify the user 304 and/or to identify gestures presented by the user 304. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers" and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
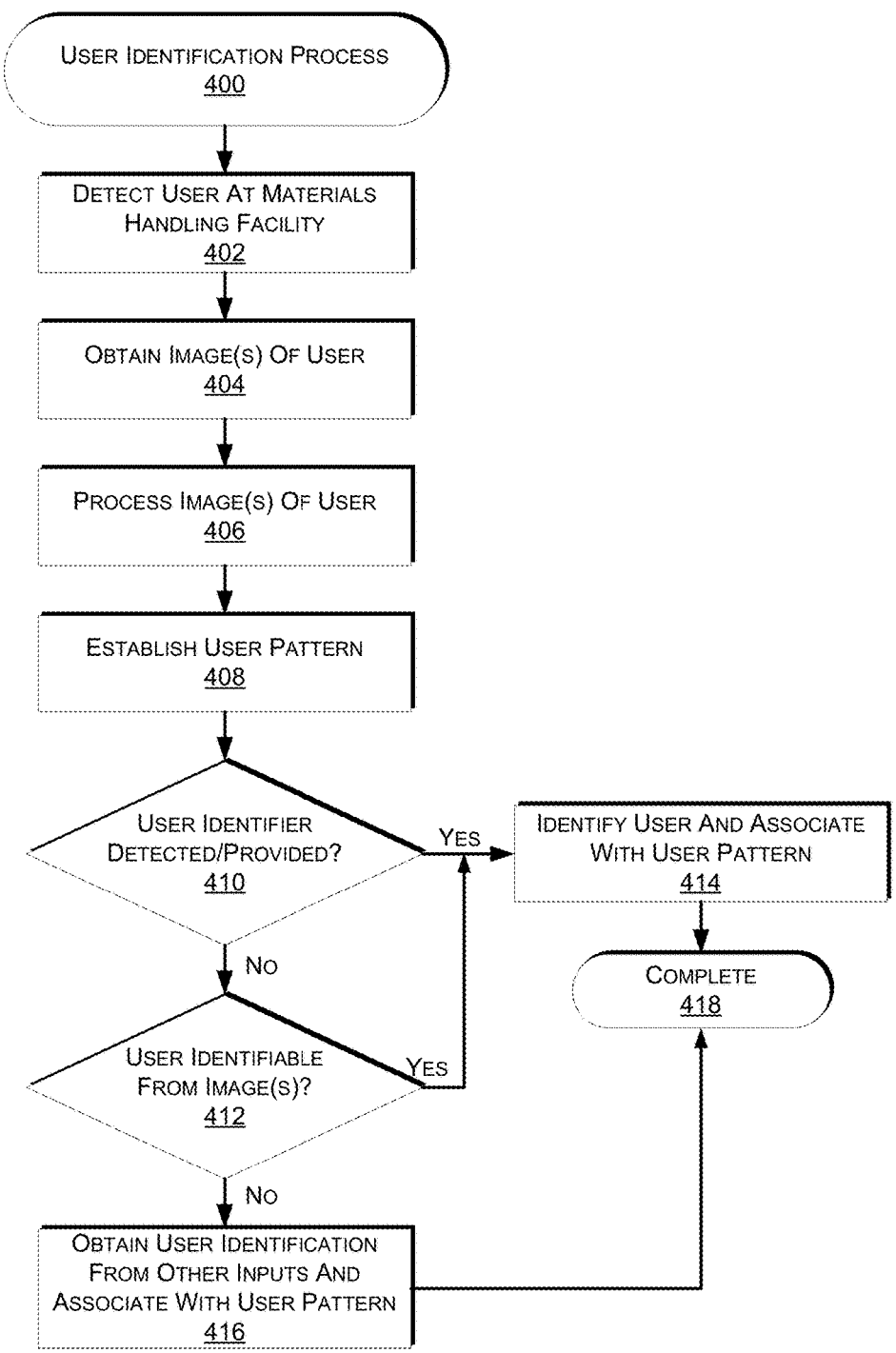
FIG. 4 depicts a flow diagram of an example process for identifying a user, according to some implementations.

FIG. 4 depicts a flow diagram of an example process 400 for identifying a user, according to some implementations. The process of FIG. 4 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins by detecting a user at or within the materials handling facility, as in 402. Upon detecting a user at or within the materials handling facility, one or more images of the user are obtained, as in 404, and processed, as in 406. Various techniques may be used to process the images. For example, image capture and facial and/or feature recognition may be used to process the image. Based on the processed images, a user pattern representative of the image is established, as in 408. Generally, the user pattern is a representation of the user that can be used to assist in tracking and/or identifying the user within the materials handling facility. For example, the user pattern may be a two-dimensional representation of the user's size and shape. In other examples, the user pattern may be a three-dimensional representation of the user's size and shape.

In some implementations, distinguishing features of the user may be detected and included as part of the user pattern. For example, if the user is wearing a bright colored shirt, has a tattoo, is wearing a hat, etc., any of those distinguishing features may be detected and included as part of the user pattern. Likewise, the user's gate, cadence, body language, etc. may be included in the user pattern and utilized to assist in tracking and/or identifying the user within the materials handling facility.

Returning to the example process 400, upon establishing a user pattern for the detected user, a determination is made as to whether a user identifier was detected and/or provided by the user, as in 410. The user identifier may be any unique identification that is associated with the user. For example, the user identifier may be an active tag, such as a radio frequency identification ("RFID") tag, visual tag, such as a barcode, bokode, etc., a user provided identifier (e.g., user name and password), biometric identification, or any other type of identifier that may uniquely identify the user.

If a user identifier is not detected and/or provided by the user, a determination is made as to whether the identity of the user can be determined from the obtained images, as in 412. For example, facial and/or feature recognition may be performed on the image(s) (as in 406) and the results compared to user profiles stored in the user profile data store. If the features obtained from the processed image correspond with a stored user profile, the user can be identified from the stored user profile. If the user is identifiable from the obtained images, or if a user identifier is detected and/or provided, the user is identified and associated with the user pattern, as in 414. Associating the user with the user pattern may include associating the user profile with the user pattern, a user account of the user with the user pattern, etc.

However, if it is determined that the user is not identifiable from the obtained image(s), identification of the user is obtained through other inputs, as in 416. For example, the user may be asked for identification, the user may continue to be monitored until a user identification can be determined, etc. Upon obtaining the user identification from other inputs, or after associating the user profile with the user pattern, the example process 400 completes, as in 418.

Figure 5:
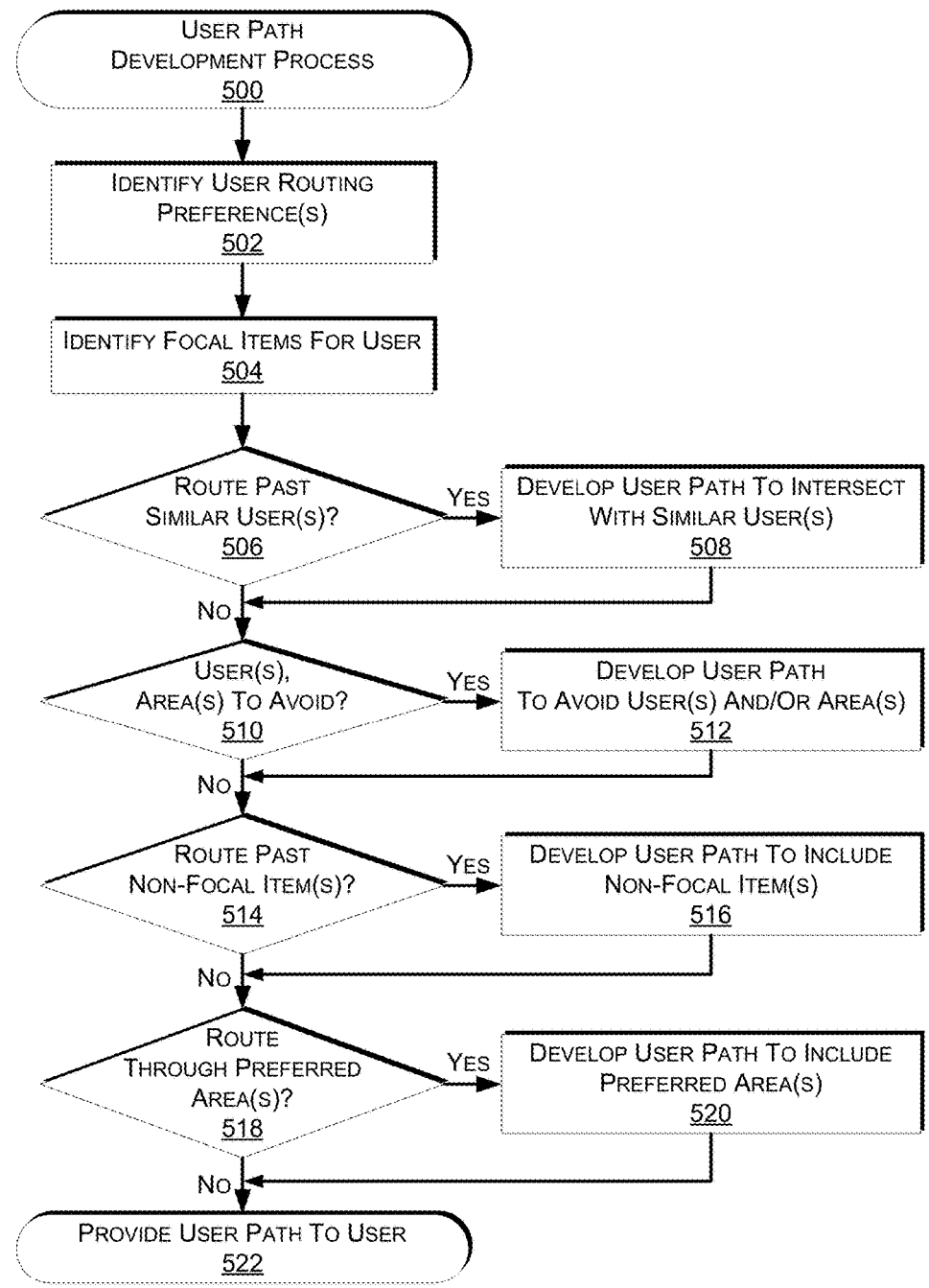
FIG. 5 depicts a flow diagram of an example process for developing a user path, according to some implementations.

FIG. 5 is a block diagram of an example process 500 for developing and/or redeveloping a user path, according to some implementations. The example process 500 begins by identifying user interaction preferences, as in 502. This may be done when the user enters the materials handling facility and/or in response to a determination that the user path is to be redeveloped, as discussed below with respect to FIG. 6.

A user may specify their interaction preference and/or preferences may be determined based on the actions of users while in the materials handling facility. For example, a user may indicate that they prefer to get into the materials handling facility, pick their items and leave the materials handling facility as fast as possible without having to interact with anyone. In another example, a user may indicate that they are interested in interaction with other known users, and/or other similar users.

In addition to determining user preferences, focal items for the user may be identified, as in 504. As discussed above, a focal item is any item that is planned to be picked by the user. For example, a focal item may be an item included on a user's pick list—a list of items that are to be picked by the user, items identified by the user that they are going to pick (e.g., shopping list), and the like. In some implementations, the user may provide or be provided a list of items to be picked from the materials handling facility. In other implementations, the items the user will likely pick from the materials handling facility may be determined based on the user's profile. For example, the user profile may identify the items the user has previously picked, the frequency with which those items were picked and the likelihood of a re-picking of those items (e.g., the item has likely been consumed). For example, if the materials handling facility is a store and the user picks the same three items each time they are in the store, it may be determined that the user is likely to pick those three items.

Based on the user preferences and/or the identified focal items, a determination may be made as to whether to route the user past similar and/or known users, as in 506. For example, if the user has historically stopped and interacted with a particular other user, the example process may determine if that other user is in the materials handling facility and if so, route the user such that the two user paths intersect. In other implementations, historical information about the user may be used to identify other users within the materials handling facility that are similar. For example, if the user always wears a cancer awareness pin, other users wearing similar pins may be identified and the user path developed such that it intersects with the user path of those other individuals. If it is determined that the user is to be routed past similar users, a user path is developed that intersects with the path of the other identified user, as in 508.

In addition to determining whether to route a user past other similar users, a determination may also be made as to whether there are other users and/or areas within the materials handling facility that should be avoided, as in 510. For example, if a past interaction between the user and another user located in the materials handling facility was negative (e.g., the user frowned, the interaction was very brief), it may be determined that the other user should be avoided. Likewise, if one area of the facility is blocked off, crowded, expected to be crowded, etc., that area may be avoided. For example, if an item has been dropped or spilled, inventory is being added, the floor is wet, etc., the area of the materials handling facility where the drop or spill or other activity occurred may be blocked off such that users are not routed through the area. As another example, user paths may be collectively analyzed to identify areas of historical, current and/or anticipated congestion. A congested area, may be an area in which multiple user paths intersect and/or converge, an area where users typically stop or pause for a period of time, etc. Congested areas may be avoided when developing the user path. If it is determined that other users and/or areas within the materials handling facility are to be avoided, the user path is developed such that those users and/or areas are avoided, as in 512.

A determination may also be made as to whether the user should be routed past non-focal items, as in 514. As discussed above, non-focal items include any items, other than focal items, identified as of potential interest by the user and included in the planning of the user path through the materials handling facility. In one implementation, recommended items may be identified based on the past purchase history of the user. For example, if a user typically purchases a brand name product, one or more generic substitutes may be identified and recommended to the user as an alternative, lower cost product. In some implementations, items may be recommended based on purchases of other similar users. For example, if the other users identified as similar to the user often purchase item X, item X may be recommended to the user. In other implementations, one or more products may be paired or curated and recommended together. For example, a famous chef, celebrity and/or diet may be utilized to select product pairings, or groups, that are curated and recommended together for picking. In some implementations, a user may select one or more individuals as preferred curators and receive curated recommendations from those individuals.

Other examples of non-focal items may include promotional items offered by the materials handling facility. For example, if the materials handling facility is offering item B for sale, item B may be identified as a non-focal item. If it is determined that the user is to be routed past non-focal items, one or more non-focal items are identified for the user and the user path is developed such that the user passes by the identified non-focal items as they progress through the materials handling facility, as in 516.

Finally, a determination may be made as to whether the user should be routed through areas within the materials handling facility preferred by the user, as in 518. For example, based on the historical behavior of the user, certain areas of the materials handling facility may be frequently visited by the user, regardless of whether the user path intended to route the user through that section of the materials handling facility. Such areas may be established as preferred areas for the user. If it is determined that the user is to be routed through preferred areas, the user path is developed to include those areas within the materials handling facility, as in 520.

Upon determining the routing preferences for the user path, the user path may be completed and provided or otherwise presented to the user, as in 522. For example, all or a portion of the user path may be provided to the portable device of the user, projected from an output device within the materials handling facility, displayed on an output device within the materials handling facility, provided audibly to the user, etc. While the example process 500 is discussed with respect to one user and a set of planned items, in some implementations, multiple users may arrive at the materials handling facility together and both are to pick items from the same set of planned items. For example, two individuals may arrive together to pick a group of items (planned items) that they will share. Rather than providing one user path to pick the planned items, two users paths may be developed, one for each individual that collectively pass each of the planned items. In such an implementation, the routing preferences, etc., may be based on the individual associated with the user path. In other implementations, the same user preference, etc., may be used for each user path.

In still other implementations, rather than a user path being developed that is followed by the user, a path may be developed that is followed by an associate to bring an item to the user. For example, as the user navigates through the materials handling facility, the user may select an item. An associate, human and/or robotic, may retrieve the selected item from an inventory location and deliver the item to the user. As part of the delivery process, a path through the materials handling facility may be developed that is followed by the associate and that navigates the associate to the user.

In still another implementation, user paths may be viewed by other users. For example, user paths of other users in the materials handling facility may be provided to the portable device of the user and viewable by the user via the portable device. In other implementations, the user path of other users may be presented on an output device near the user.

Figure 6:
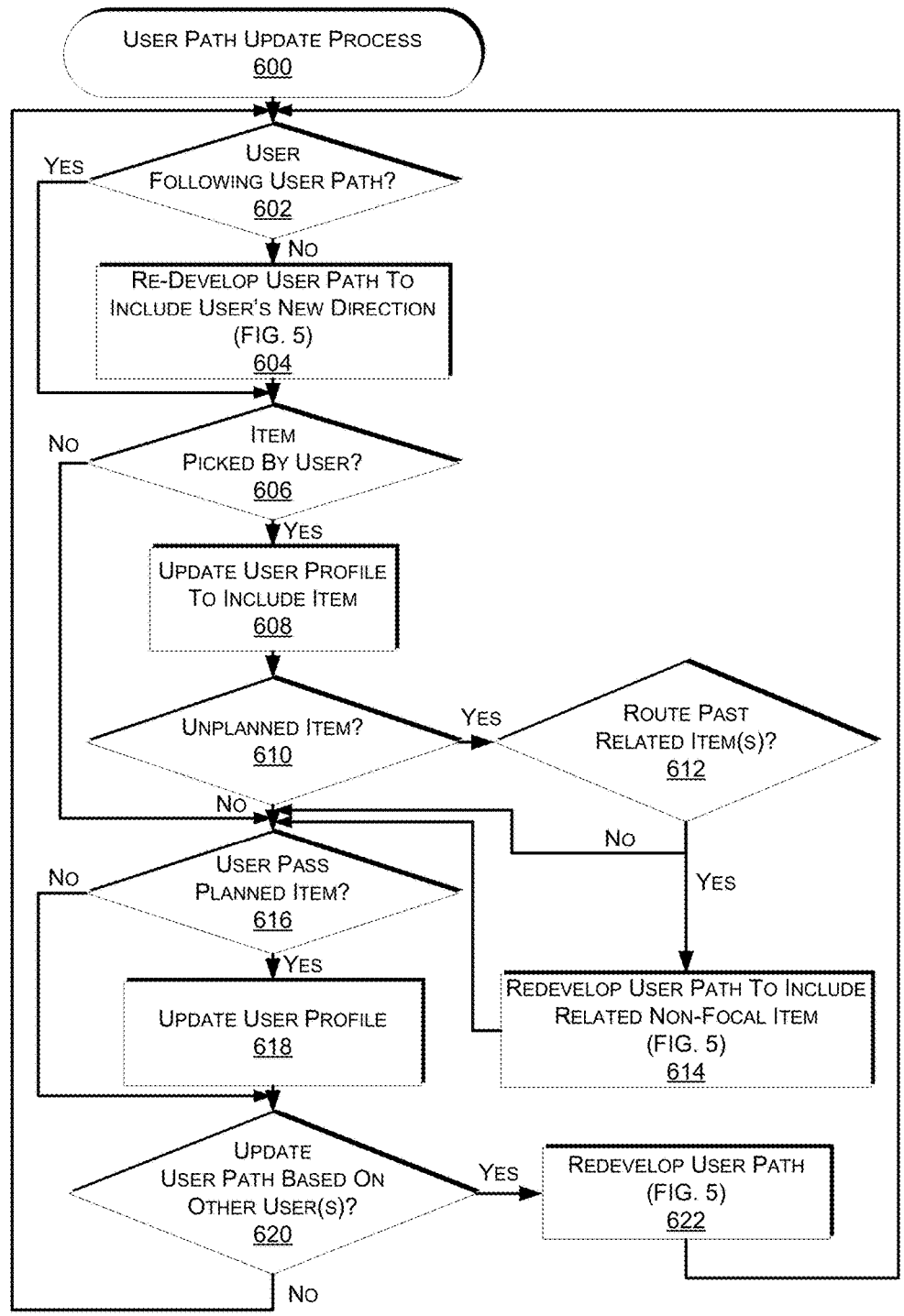
FIG. 6 depicts a flow diagram of an example process for updating a user path, according to some implementations.

FIG. 6 is a flow diagram of an example process 600 for updating a user path, according to some implementations. The example process 600 begins by determining if a user is following the presented user path, as in 602. A user is considered following the user path if they are navigating through the materials handling facility along the direction suggested by the user path. For example, if the user path suggests that the user walk down the third aisle, and the user is walking down the third aisle, it may be determined that the user is following the user path. However, if it is determined that the user is not following the user path, the user path may be redeveloped based on the new direction and/or location of the user, as in 604. For example, if the user path suggested that the user walk down the third aisle but the user continued past the third aisle and instead turned down the fifth aisle, the location of the user may be determined and the user path redeveloped based on the current location and/or direction of the user. The process for developing and/or redeveloping the user path is discussed above with respect to FIG. 5.

If it is determined that the user is following the user path, or upon redevelopment of the user path, a determination is made as to whether an item has been picked by the user, as in 606. If it is determined that the user has picked an item, the user profile is updated to include the picked item, as in 608. For example, the user profile may include an item list identifying each item picked by the user while located in the materials handling facility. Accordingly, when an item is picked by the user, the item list may be updated to include an identification of the item. Likewise, a user pick history may be updated to include an identification of the picked item. In some implementations, the user preferences may also be updated to consider the picked item.

Picked items may be identified using a variety of techniques. For example, inventory information may be maintained for the materials handling facility that includes, for each item, location information identifying where the item is stored. Based on the known location of the user and the inventory in that location, the list of potential items can be reduced to only consider items near the user. In addition, image analysis may be performed to identify the item, the shape of the item and/or identifiers included on the item (e.g., stock-keeping unit ("SKU"), bar code, quick response code ("QR code"), label information). This may be done in a recursive manner. For example, the image may be processed to determine if an identifier for the item can be determined and matched with item inventory information maintained by the inventory management system 150. If a match is found, the item is identified. If a match is not found, the image may be further analyzed to determine an approximate shape and size of the item selected by the user. The determined approximate shape and size of the item may then be compared to item inventory information stored by the inventory management system 150 for items known to be located in the area of the user. If a match is found, the item is identified.

If multiple items are in the area of the user, such that a single item cannot be selected based on the approximate size and shape of the item, the image may be further processed to identify other characteristics of the item, such as the item's color, wording on the item, etc. In some implementations, additional information from the image other than the item may also be processed. For example, information from the shelf from which the item was selected may be processed to assist in identifying the selected item. If there are multiple items on the shelf in the area from where the user removed the item that appear similar to the selected item, images of those items may be processed to assist in identifying the item; as they are likely the same item. Likewise, label information on the shelf (e.g., product name, price, bar code) may be processed to assist in identifying the item. The image may continue to be processed until the item is identified. In some implementations, images of the items on the shelf obtained before the item was removed may be compared to images of the shelf after the item was removed to assist in identifying the removed item. In still other examples, a weight and/or pressure sensor may be included in the shelf and when the item is removed the reduced weight can be measured and used to assist in identifying the item.

In addition to identifying the item and updating the user profile, a determination is made as to whether the picked item is an unplanned item. As discussed above, an unplanned item is any item that was not considered during the development of the user path. If it is determined that the picked item is an unplanned item, a determination is made as to whether the user path should be updated to route the user past one or more items that are related to the unplanned item, as in 612. For example, if the unplanned item is paired with another item (e.g., curated pairing) and/or frequently purchased together with another item, the other item may be identified as a new non-focal item and the user path may be redeveloped to route the user past the new non-focal item, as in 614.

After redevelopment of the user path (614), if it is determined that the user path is not to be redeveloped (612), or if it is determined that the user has not picked an item (606), a determination is made as to whether the user has passed a planned item without picking the planned item, as in 616. For example, if the user is following the user path but navigates past a planned item without picking the planned item, it may be determined that the user has passed the planned item. If it is determined that the user has passed the planned item, the user profile may be updated to include feedback that the user is not interested in the planned item, as in 618. For example, if the planned item was identified by the inventory management system 150 because the user historically picked the item each time they were in the materials handling facility, the user profile may be updated to identify that the user's behavior, at least during this instance while in the materials handling facility, has changed.

In some implementations, if the user passes a planned item, a determination is made as to whether the passed planned item is a focal item. If it is determined that the past planned item is a focal item, the user may be notified that they have passed a focal item and asked if they intended to pass the focal item. If the user indicates that they did not intend to pass the focal item, the user path may be redeveloped so that the user will again be routed past the focal item so that the user will have another opportunity to pick the item. In other implementations, rather than notifying the user that they have passed a focal item, the user path may be automatically redeveloped to again route the user past the focal item. In still other implementations, a user may be notified of any planned item they pass, focal item or non-focal item. In such an implementation, the user may indicate whether they intended to pass the planned item. If the user did not intend to pass the planned item, the user path may be redeveloped to again route the user past the planned item so that it can be picked by the user.

If the user identifies that they did not intent to pass the planned item and the user path is redeveloped, the system may be updated to identify the location of the passed item. Passed item information may be maintained for multiple users and aggregated to identify areas within the materials handling facility in which items are often passed unintentionally. For areas with a high frequency of unintentionally passed items, the area may be redeveloped and/or the item moved.

Upon updating the user profile, or if it is determined that the user has not passed a planned item, a determination is made as to whether the user path should be updated based on other users within the materials handling facility, as in 620. For example, if the user path was developed to intersect with the user path of another user located in the materials handling facility, but that other user's user path has been modified, the user path may likewise need to be modified so the two intersect. Likewise, if the user path was developed to avoid another user, but that other user has navigated into an area of the materials handling facility that was not anticipated and/or the user path associated with the other user has changed, the user path may need to be updated to avoid the other user. If it is determined that the user path associated with the user is to be updated based on other users and/or user paths associated with other users, the user path is redeveloped, as in 622. Development and/or redevelopment of the user path are discussed above with respect to FIG. 5.

After redeveloping the user path, or if it is determined at decision block 620 that the user path does not need to be redeveloped, the example process 600 returns to decision block 602 and continues. The example process 602 may continue while the user is located in the materials handling facility, dynamically updating and/or redeveloping the user path based on the actions and/or movements of the user and/or other users located in the materials handling facility.

While the examples provided in the example processes 500 and 600 are illustrated as serial processes, in other implementations, the decisions may be made in any order and/or in parallel. Likewise, other factors may be considered in the development and/or redevelopment of a user path through the materials handling facility. For example, the user path and/or preference may vary depending on the time of day, gestures presented by the user, the day of the week, the time of year, etc.

Figure 7:
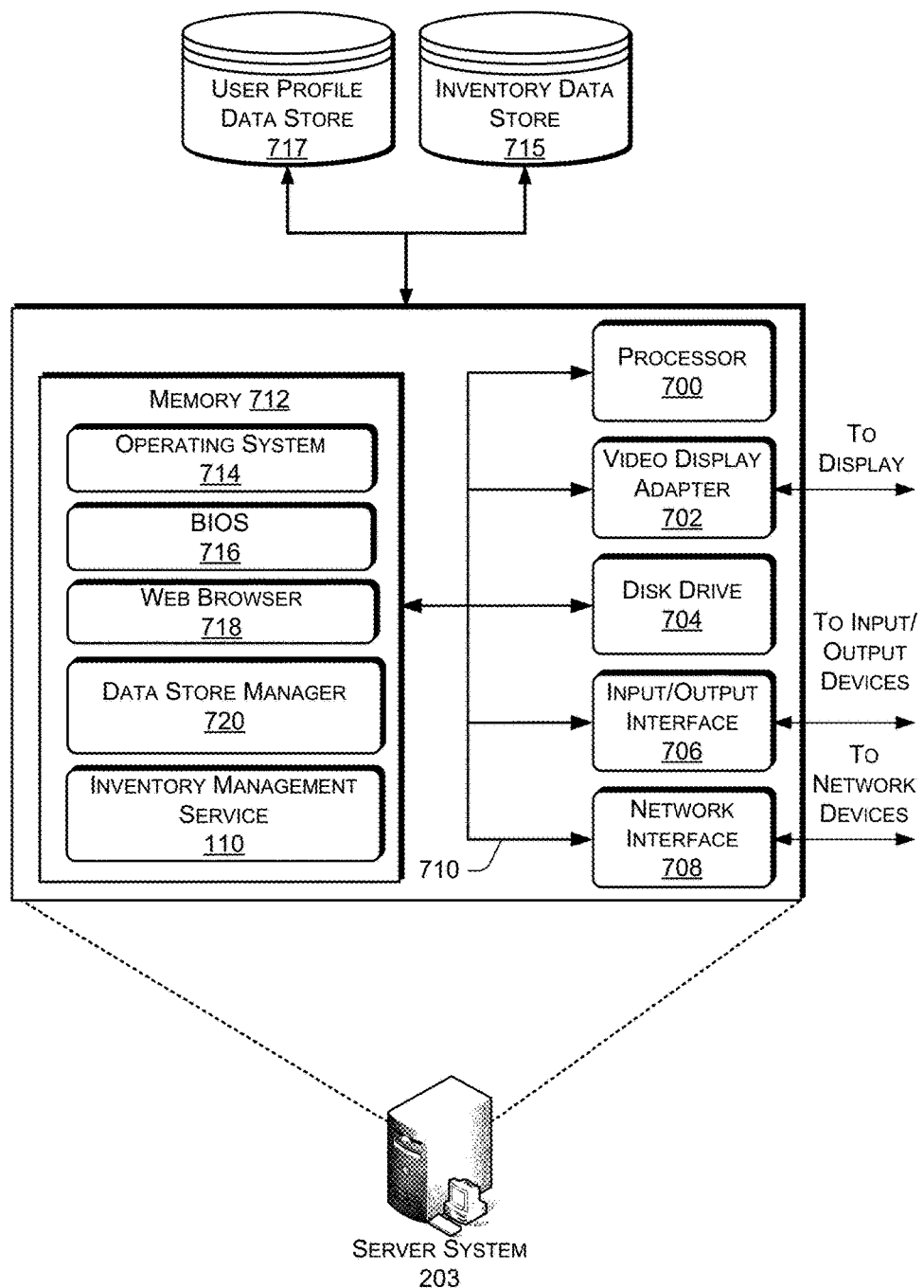
FIG. 7 is a block diagram of an illustrative implementation of a server system that may be used with various implementations.

FIG. 7 is a pictorial diagram of an illustrative implementation of a server system, such as the server system 203 that may be used in the implementations described herein. The server system 203 may include a processor 700, such as one or more redundant processors, a video display adapter 702, a disk drive 704, an input/output interface 706, a network interface 708, and a memory 712. The processor 700, the video display adapter 702, the disk drive 704, the input/output interface 706, the network interface 708, and the memory 712 may be communicatively coupled to each other by a communication bus 710.

The video display adapter 702 provides display signals to a local display (not shown in FIG. 7) permitting an operator of the server system 203 to monitor and configure operation of the server system 203. The input/output interface 706 likewise communicates with external input/output devices not shown in FIG. 7, such as a mouse, keyboard, scanner, or other input and output devices that can be operated by an operator of the server system 203. The network interface 708 includes hardware, software, or any combination thereof, to communicate with other computing devices. For example, the network interface 708 may be configured to provide communications between the server system 203 and other computing devices via the network 202, as shown in FIG. 2 and FIG. 3.

The memory 712 generally comprises random access memory (RAM), read-only memory (ROM), flash memory, and/or other volatile or permanent memory. The memory 712 is shown storing an operating system 714 for controlling the operation of the server system 203. A binary input/output system (BIOS) 716 for controlling the low-level operation of the server system 203 is also stored in the memory 712.

The memory 712 additionally stores program code and data for providing network services that allow the inventory management system 150 to identify users and/or items within the materials handling facility. Accordingly, the memory 712 may store a browser application 718. The browser application 718 comprises computer executable instructions, that, when executed by the processor 700 generate or otherwise obtain configurable markup documents such as Web pages. The browser application 718 communicates with a data store manager application 720 to facilitate data exchange between the inventory data store 715 and/or the user profile data store 717.

As used herein, the term "data store" refers to any device or combination of devices capable of storing, accessing and retrieving data, which may include any combination and number of data servers, databases, data storage devices and data storage media, in any standard, distributed or clustered environment. The server system 203 can include any appropriate hardware and software for integrating with the data stores 715, 717 as needed to execute aspects of the inventory management system 150.

The data stores 715, 717 can include several separate data tables, databases or other data storage mechanisms and media for storing data relating to a particular aspect. For example, the data stores 715, 717 illustrated include mechanisms for inventory information, user profile information, etc., which can be used to identify users, and/or develop user paths for users.

It should be understood that there can be many other aspects that may be stored in the data stores 715, 717. The data stores 715, 717 are operable, through logic associated therewith, to receive instructions from the server system 203 and obtain, update or otherwise process data in response thereto.

In addition to maintaining information about inventory and determining whether to provide assistance, the inventory management system 150 may provide assistance to the users. For example, the inventory management system 150, through communication between the server system 203, may provide information about an item to a user.

The memory 712 may also include the inventory management system 150, discussed above. The inventory management system 150 may be executable by the processor 700 to implement one or more of the functions of the server system 203. In one implementation, the inventory management system 150 may represent instructions embodied in one or more software programs stored in the memory 712. In another implementation, the inventory management system 150 can represent hardware, software instructions, or a combination thereof.

The server system 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction in FIG. 7 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method for developing a user path, comprising:
    under control of one or more computing systems configured with executable instructions,
        identifying a user at a materials handling facility;
        determining a plurality of planned items that are anticipated to be picked by the user;
        determining a user routing preference through the materials handling facility for the user;
        determining a user path through the materials handling facility that passes by one or more locations within the materials handling facility associated with each of the planned items and is based at least in part on the user routing preference;
        transmitting information about at least a portion of the user path to the user;
    receiving, from at least one imaging device positioned within the materials handling facility, image data representative of at least a portion of the user and at least a portion of a first item;
        processing the image data to determine:
            that the user has picked the first item from a first inventory location; and
            at least one of a shape of the first item or an identifier included on the first item;
        determining, based at least in part on one or more of the shape of the first item, the identifier included on the first item, or inventory information maintained for inventory items known to be located at the first inventory location, an identity of the first item;
        determining that the first item picked by the user is not one of the plurality of planned items; and
        in response to determining that the first item picked by the user is not one of the plurality of planned items:
            determining, based at least in part on the identity of the first item, a second item that is associated with the first item; and
            modifying the user path through the materials handling facility to pass a second inventory location within the materials handling facility of the second item.

2. The computer-implemented method of claim 1, wherein the plurality of planned items includes at least one focal item and at least one non-focal item.

3. The computer-implemented method of claim 2, wherein:
the at least one focal item is at least one of an item from an item pick list, an item identified by the user to be picked, or an item anticipated to be picked by the user based at least in part on a past picking of the item by the user; and
the at least one non-focal item is at least one of a recommended item, a curated item paired with at least one of the at least one focal item, an item included on a user wish list, an item previously picked by the user, an item related to at least one of the at least one focal item, or a promotional item.

4. The computer-implemented method of claim 1, further comprising:
updating a user profile associated with the user based at least in part on the first item.

5. The computer-implemented method of claim 1, wherein modifying the user path includes:
identifying a non-focal item related to the first item; and
modifying the user path through the materials handling facility so the user path passes by a location associated with the non-focal item.

6. The computer-implemented method of claim 1, further comprising:
determining, while the user is in the materials handling facility, that a third item of the plurality of planned items that is available at the materials handling facility has not been picked; and
updating a user profile associated with the user based at least in part on the third item that has not been picked by the user.

7. The computer-implemented method of claim 6, wherein:
determining that the third item has not been picked is based at least in part on determining that the user has passed a third inventory location within the materials handling facility associated with the third item;
the third item is a focal item; and
transmitting a notification to the user indicating that the user has passed the third inventory location of the focal item.

8. The computer-implemented method of claim 1, further comprising:
updating the user path based at least in part on a movement of a second user within the materials handling facility, wherein the user path identifies a path through the materials handling facility that intersects with a second path of the second user.

9. The computer-implemented method of claim 8, wherein the second user is selected based at least in part on a similarity between the user and the second user or based at least in part on an association between the user and the second user.

10. A system, comprising:
a memory; and
one or more processors storing program instructions that when executed by the one or more processors cause the one or more processors to at least:
determine a user at a materials handling facility;
determine a plurality of planned items that are anticipated to be picked by the user;
determine a user routing preference through the materials handling facility for the user;
determine a user path through the materials handling facility that passes by one or more locations within the materials handling facility associated with each of the planned items and is based at least in part on the user routing preference;
transmit information about at least a portion of the user path to the user;
receive, from at least one imaging device positioned within the materials handling facility, image data representative of at least a portion of the user and at least a portion of a first item;
process the image data to determine:
that the user has picked the first item from a first inventory location; and
at least one of a shape of the first item or an identifier included on the first item;
determine, based at least in part on one or more of the shape of the first item, the identifier included on the first item, or inventory information maintained for inventory items known to be located at the first inventory location, an identity of the first item;
determine that the first item picked by the user is not one of the plurality of planned items; and
in response to determining that the first item picked by the user is not one of the plurality of planned items:
determine, based at least in part on the identity of the first item, a second item that is associated with the first item; and
modify the user path through the materials handling facility to pass a second inventory location within the materials handling facility of the second item.

11. The system of claim 10, wherein the plurality of planned items includes at least one focal item and at least one non-focal item.

12. The system of claim 11, wherein:
the at least one focal item is at least one of an item from an item pick list, an item identified by the user to be picked, or an item anticipated to be picked by the user based at least in part on a past picking of the item by the user; and
the at least one non-focal item is at least one of a recommended item, a curated item paired with at least one of the at least one focal item, an item included on a user wish list, an item previously picked by the user, an item related to at least one of the at least one focal item, or a promotional item.

13. The system of claim 10, wherein the program instructions that when executed by the one or more processors further cause the one or more processors to at least:
update a user profile associated with the user based at least in part on the first item.

14. The system of claim 10, wherein the program instructions that when executed by the one or more processors to cause the one or more processors to modify the user path further include program instructions that when executed by the one or more processors further cause the one or more processors to at least:
identify a non-focal item related to the first item; and
modify the user path through the materials handling facility so the user path passes by a location associated with the non-focal item.

15. The system of claim 10, wherein the program instructions that when executed by the one or more processors further cause the one or more processors to at least:
- determine, while the user is in the materials handling facility, that a third item of the plurality of planned items that is available at the materials handling facility has not been picked; and
- update a user profile associated with the user based at least in part on the third item that has not been picked by the user.

16. The system of claim 15, wherein:
- it is determined that the third item has not been picked based at least in part on a determination that the user has passed a third inventory location within the materials handling facility associated with the third item;
- the third item is a focal item; and
- the program instructions when executed by the one or more processors further cause the one or more processors to transmit a notification to the user indicating that the user has passed the third inventory location of the focal item.

17. The system of claim 10, wherein the program instructions that when executed by the one or more processors further cause the one or more processors to at least:
- update the user path based at least in part on a movement of a second user within the materials handling facility, wherein the user path identifies a path through the materials handling facility that intersects with a second path of the second user.

18. The system of claim 17, wherein the second user is selected based at least in part on a similarity between the user and the second user or based at least in part on an association between the user and the second user.

* * * * *